United States Patent
Yu

(10) Patent No.: US 9,882,988 B1
(45) Date of Patent: Jan. 30, 2018

(54) AUTONOMOUS PAIRING OF INTERNET OF THINGS DEVICES

(71) Applicant: Chengfu Yu, Walnut, CA (US)

(72) Inventor: Chengfu Yu, Walnut, CA (US)

( * ) Notice: Subject to any disclaimer, the term of this patent is extended or adjusted under 35 U.S.C. 154(b) by 0 days.

(21) Appl. No.: 15/386,670

(22) Filed: Dec. 21, 2016

(51) Int. Cl.
  *H04L 29/08* (2006.01)
  *H04W 4/00* (2009.01)
  *H04L 29/06* (2006.01)
  *H04W 84/12* (2009.01)
  *H04W 88/08* (2009.01)

(52) U.S. Cl.
  CPC ......... *H04L 67/12* (2013.01); *H04L 65/4076* (2013.01); *H04L 69/165* (2013.01); *H04W 4/005* (2013.01); *H04W 4/008* (2013.01); *H04W 84/12* (2013.01); *H04W 88/08* (2013.01)

(58) Field of Classification Search
  None
  See application file for complete search history.

(56) References Cited

U.S. PATENT DOCUMENTS

| | | | |
|---|---|---|---|
| 6,212,190 B1* | 4/2001 | Mulligan | H04L 29/06 370/400 |
| 8,259,691 B2 | 9/2012 | Zimmerman et al. | |
| 2004/0027996 A1* | 2/2004 | Birdwell | H04L 12/18 370/270 |
| 2012/0099567 A1* | 4/2012 | Hart | H04L 12/4633 370/338 |
| 2013/0259020 A1* | 10/2013 | Ullah | G01S 5/02 370/338 |

* cited by examiner

*Primary Examiner* — Hassan Kizou
*Assistant Examiner* — Ashil Farahmand

(57) ABSTRACT

A human-machine interface system is disclosed. The system includes a user interface configured to receive a user input wherein the user input includes network access credentials and a processing system configured to determine a total number of bytes to represent the wireless network access credentials, wherein the determining is based on the length of the wireless network access credentials, and wherein the processing system is further configured to determine a total number of a user datagram (UDP) packets based on the total number of bytes. The system further includes a machine interface configured to program the total number of UDP packets, wherein at least a portion of each of the UDP packets is based on the wireless network access credentials.

12 Claims, 6 Drawing Sheets

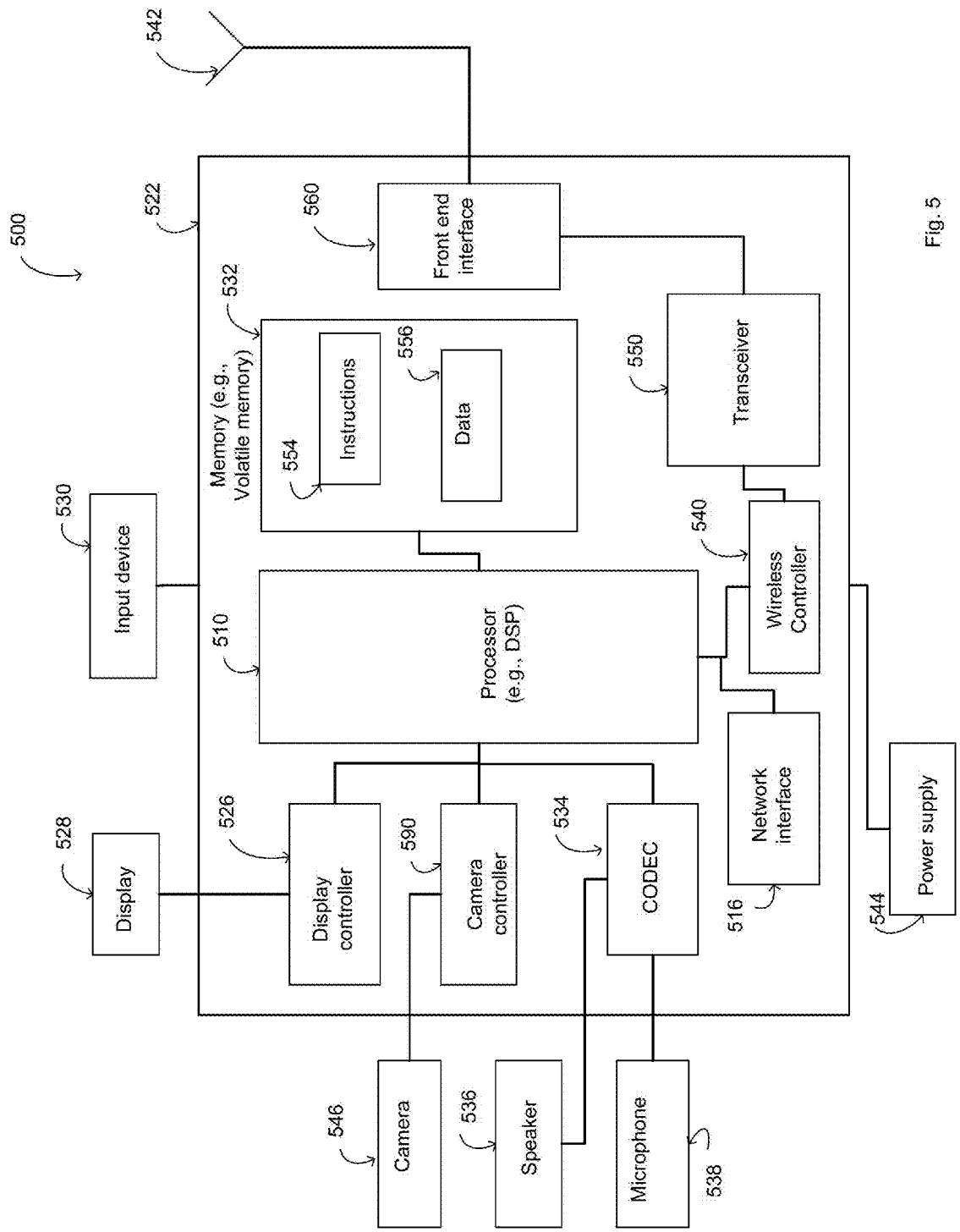

AUTONOMOUS PAIRING OF INTERNET OF THINGS DEVICES

TECHNICAL FIELD

The present disclosure generally relates to internet of things (IoT) devices and in particular, for example, to pairing of the IoT devices in a WiFi™ network.

BACKGROUND

In a world of ever increasing smart devices and smarter technologies, the internet of things (IoT) proposes that everyday objects and devices (e.g., light bulbs, washing machines and cameras) are to have an internet connection, where these objects are enabled to send and/or receive data to and from other devices, thus forming a larger network of connected things (i.e., objects and devices). The IoT promises smarter homes and work environments where all the objects are seamlessly connected and controlled for easier and more convenient operation.

An important aspect of the devices of the IoT is their initial pairing and setup to join the internet. Conventionally, devices that are connected to the internet are connected by joining a WiFi™ network via a WiFi™ router. For example, computers or smart phones are connected via the use of a service set identifier (SSID) and passphrase that are unique to the WiFi™ router that are typed into the computer or the smart device by the user to enable the device to join the WiFi™ router and hence the WiFi™ network. Most of the devices that users have been connecting to WiFi™ routers have had rich computing resources (e.g., displays, keyboards, and other components that make entering the information for a secure connection relatively easy).

However, most of the proposed devices and objects of the IoT being added to the internet from homes, offices, commercial spaces, and industrial facilities are quite small and don't have a display or convenient data entry capability to allow users to configure them. Thus, the devices need to be configured by a smarter device that can transmit the necessary configuration information to join the WiFi™ network. For example, if a user wants to pair an IoT device (e.g., an IP-Camera) with his smart phone, to enable the user to remotely operate the camera from his smart phone, the user needs to enable the IoT device to join the WiFi™ network first. There are a few options to do so; for example, the user might be able to establish a direct connection between the IoT device and the user's smart phone device. The direct connection may be a Universal Serial Bus (USB) connection, Bluetooth low energy (BLE) connection, an Eye camera connection, a Quick Response (QR) connection, or a sound-wave enabled connection.

However, these connections have their limitations. For example, most require that the IoT device is within the reach of the user and/or do have a direct line of sight. For example, if a user wants to enable a large number of light bulbs into the network then this will raise a challenge, one due to the number of bulbs to be connected and another for location of the light bulbs and their accessibility. Another limitation, for example, is when the user has more than one IoT device that needs to be added to the WiFi™ network. This implies that the user has to enable the devices one device at a time for all the IoT devices to join the WiFi™ network. The inconvenience of adding IoT devices one at a time and the cost that arises from the need for additional hardware within the IoT device to enable the IoT devices into the WiFi™ network presents challenges to the new and upcoming IoT technology, especially for older already existing WiFi™ routers that are part of older than the 802.11AP WiFi™ standard (e.g., 802.11a). Accordingly, there is a need in the art for a more efficient and convenient approach to connect IoT devices to the WiFi™ network.

SUMMARY

The disclosed subject matter relates to a human-machine interface (HMI) system. The system includes a user interface configured to receive a user input wherein the user input includes network access credentials and a processing system configured to determine a total number of bytes to represent the wireless network access credentials, wherein the determining is based on the length of the wireless network access credentials, and wherein the processing system is further configured to determine a total number of a user datagram packets (UDP) based on the total number of bytes. The system further includes a machine interface configured to program the total number of UDP packets, wherein at least a portion of each of the UDP packets is based on the wireless network access credentials.

The disclosed subject matter also relates to a method of operating a human-machine interface system wherein the method includes, receiving user input on a user interface of a wireless user device, wherein the user input comprises wireless network access credentials, and determining a total number of bytes to represent the wireless network access credentials, wherein the determining is based at least on the length of the wireless network access credentials. The method further includes, determining a total number of user datagram packets (UDP) based on the total number of bytes; and programming the total number of the UDP packets, wherein at least a portion of each of the UDP packets is based on the wireless network access credentials.

The disclosed subject matter further relates to a non-transitory machine-readable medium including instructions stored therein, which, when executed by one or more processors of a processing system cause the one or more processors to perform operations. The operations include receiving a user input on a user interface of a wireless user device, wherein the user input comprises wireless network access credentials and determining a total number of bytes to represent the wireless network access credentials, wherein the determining is based on the length of the wireless network access credentials. The operations further include determining a total number of a user datagram (UDP) packets based on the total number of bytes; and programming the total number of the UDP packets, wherein at least a portion of each of the UDP packets is based on the wireless network access credentials.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

Certain features of the present disclosure are set forth in the appended claims. However, for purpose of explanation, several implementations of the present disclosure are set forth in the following figures.

FIG. 5 illustrates conceptually an example electronic system with which some implementations of the present disclosure may be implemented.

Figure 1:
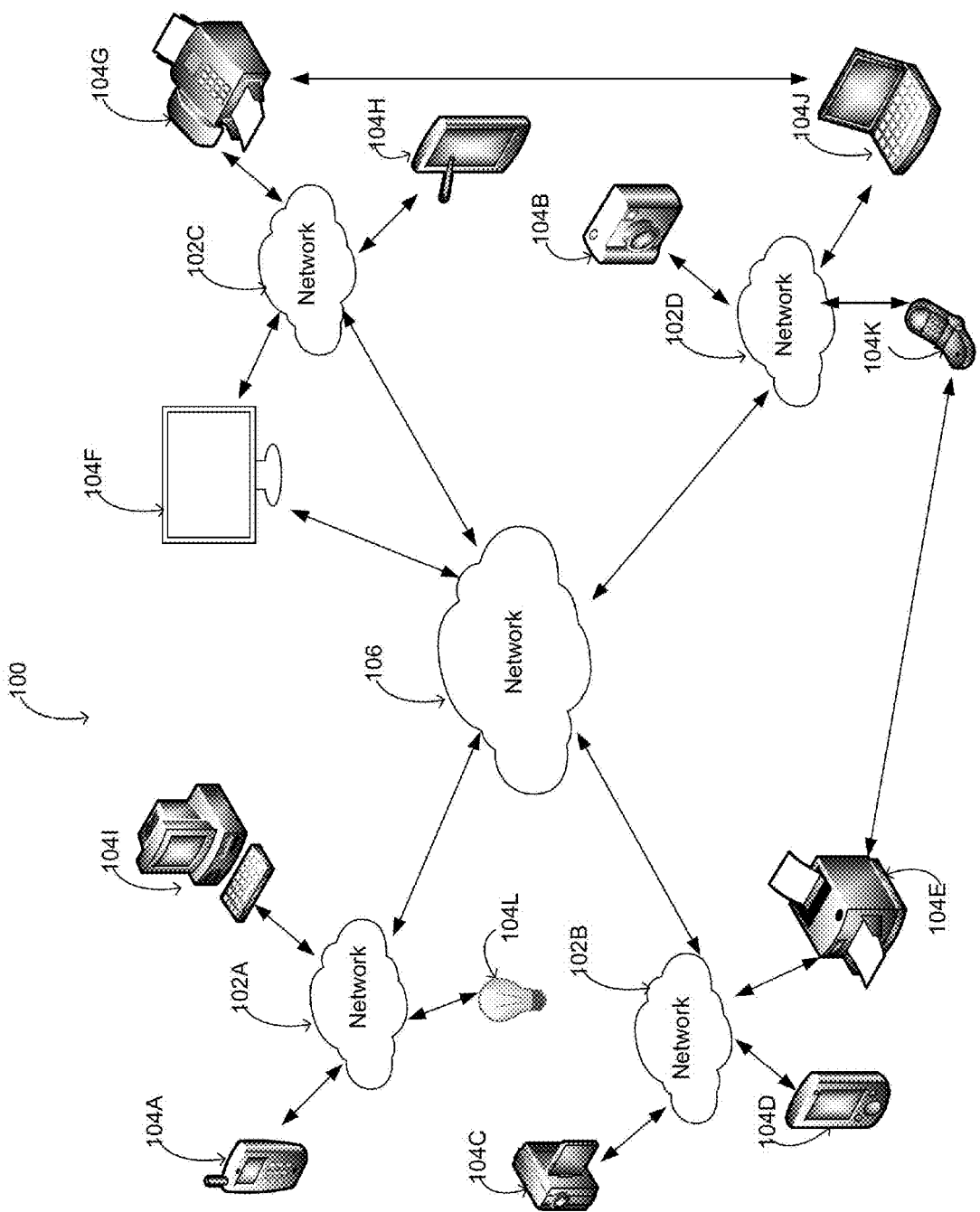
FIG. 1 illustrates an exemplary network environment for implementing an IoT system in accordance with one or more embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

The detailed description includes specific details for the purpose of providing a thorough understanding of the present disclosure. However, the present disclosure is not limited to the specific details set forth herein and may be practiced without these specific details. In some instances, structures and components are shown in block diagram form to avoid obscuring the concept of the present disclosure.

As noted above, the inconvenience of adding IoT devices into a wireless local area network, the cost of hardware needed to add the IoT devices to the wireless local area network and the existing methods to add IoT devices are few of the challenges that face IoT pairing of IoT devices and objects. Most of the time a direct connection between a smart device and an IoT device is required and even then the method is repeated multiple times depending on the number of IoT devices that needs to be added to the wireless local area network.

The present disclosure addresses these issues and discloses a method to operate a human-machine interface to autonomously add IoT devices to a wireless local area network. The IoT devices are WiFi™ enabled. The method utilizes a user interface to receive an input from a user on a wireless user device where the user input includes or is indicative of network credentials to join a wireless local area network. The method also determines a number of bytes needed to represent the network credentials and interface utilizing a machine interface within the wireless user device to program the wireless network credentials into UDP packets. The method programs the wireless network credentials on a multicast address where the multicast address is a portion of the UDP packets.

In one or more implementations, the method utilizes the wireless user device to transmit the programmed UDP packets. The UDP packets are received by a wireless access point and the wireless access point re-transmits the received UDP packets. The method also includes receiving the re-transmitted UDP packets by an IoT device. In one or more implementations, the IoT device receives the UDP packets directly from the wireless user device. The IoT device extracts the network credentials from the received re-transmitted UDP packets. Upon extraction of the network credentials, the IoT device utilizes the network credentials to request access to the wireless local area network. Once the IoT device joins the wireless local area network upon authentication of network credentials, the IoT device is then available for pairing with the originating wireless user device via a click by the user on the user interface.

In some aspects of the technology, each of the UDP packets includes a multicast address. The network credentials are programmed in the low-order 23 bits of the multicast address. For example, by way of illustration only and not by way of limitation, sixteen bits (e.g., the lower sixteen bits) of the 23 low-order bits are dedicated to characters of the network credentials, wherein in some aspects the characters are encoded (e.g., using an American Standard Code for Information Interchange (ASCII) encoder). The higher 7 bits of the 23 low-order bits are dedicated to a sequence number assigned to a UDP packet and a divider bit, where in one or more implementations, more than one UDP packets are needed to represent the network access credentials. The 7 bits are divided as follows: 6 bits dedicated to the sequence number and one bit to the divider bit. In one or more implementations, the divider bit is designated to the bit between the 16 bits of the network credentials characters and the 6 bits of the sequence number.

FIG. 1 illustrates an exemplary network environment 100 for implementing an IoT system in accordance with one or more embodiments of the present disclosure. Not all of the depicted components may be required. However, one or more implementations may require additional components, fewer components or different component not shown in network environment 100. Thus, any variations in network environment 100 may be implemented without departing from the scope of the present disclosure.

Network environment 100 may be a number of networks such as an IoT network, a private network, the internet, any other network, or combinations thereof. The network environment 100 includes networks 102A, 102B, 102C, 102D (hereafter referred to as 102A-102D) and 106. Network environment 100 includes a number of electronic devices 104A, 104B, 104C, 104D, 104E, 104F, 104G, 104H, 104I, 104J, 104K, 104L (hereafter referred to as 104A-104L). One or more of the devices 104A-104L, such as device 104A, may be a device capable of communicating with one or more of devices 104A-104L (e.g., via wired or wireless communication). In some aspects, the devices 104A-104L may include, may be embedded in, or may be coupled to a portable communication device, such as a mobile phone, a laptop, a tablet or any other communication device. The devices 104A-104L may be communicably coupled to one or more of the networks 102A-102D, 106 and/or to one or more other devices of the devices 104A-104L. As depicted in FIG. 1 examples of devices 104A-104L may include a computer, a desktop, a laptop, a tablet, a fax machine, a printer, light bulb and so forth.

One or more of the networks 102A-102D and 106 include one or more wired or wireless devices that facilitate devices communication, such as router devices, switch devices, relay devices, etc., and/or include one or more servers. One or more of the networks 102A-102D and 106, such as network 106 may be, or may include, a cloud of computers. One or more of the networks 102A-102D and 106 may be a local area network that communicatively couples one or more of the devices 104A-104D. In one or more implementations, one or more of networks 102A-102D and 106 may be referred to as an IoT network and/or a machine-to-machine (M2M) network.

One or more of the devices 104A-104L may be referred to as an IoT device and/or an M2M device and may include human-machine interface (HMI) applications and machine-interface applications. There may be multiple paths between one or more of the devices 104A-104L and/or one or more of the networks 102A-102D. One or more of the networks 102A-102D and 106 and/or devices 104A-104D are able to communicate with one another or other systems. One or more of the devices 104A-104L may include or may be a sensor that measures a physical quantity from surrounding environment and convert physical quantities into a signal. Examples of sensors include, by way of illustration only and not by way of limitation, temperature sensors, video cameras, audio recorders, motion sensors, humidity sensors, smoke detectors and other sensors.

In one or more implementations, devices 104A-104L may include one or more of active devices, passive devices and/or implemented wholly or partially as system on chip devices. Devices 104A-104L may include a transmitter, a receiver, a Global Positioning System (GPS), a Bluetooth (BT)/BLE transceiver and/or a WiFi™ transceiver. In one or more implementations, networks 102A-102D and 106 may include one or more network access points, such as a wireless access point (WAP) where the WAP is capable of transmitting a user datagram packet (UDP), where networks 102A-102D and 106 do not need to have a pre-established network connection to the receiving devices to transmit the UDP packet.

Figure 2:
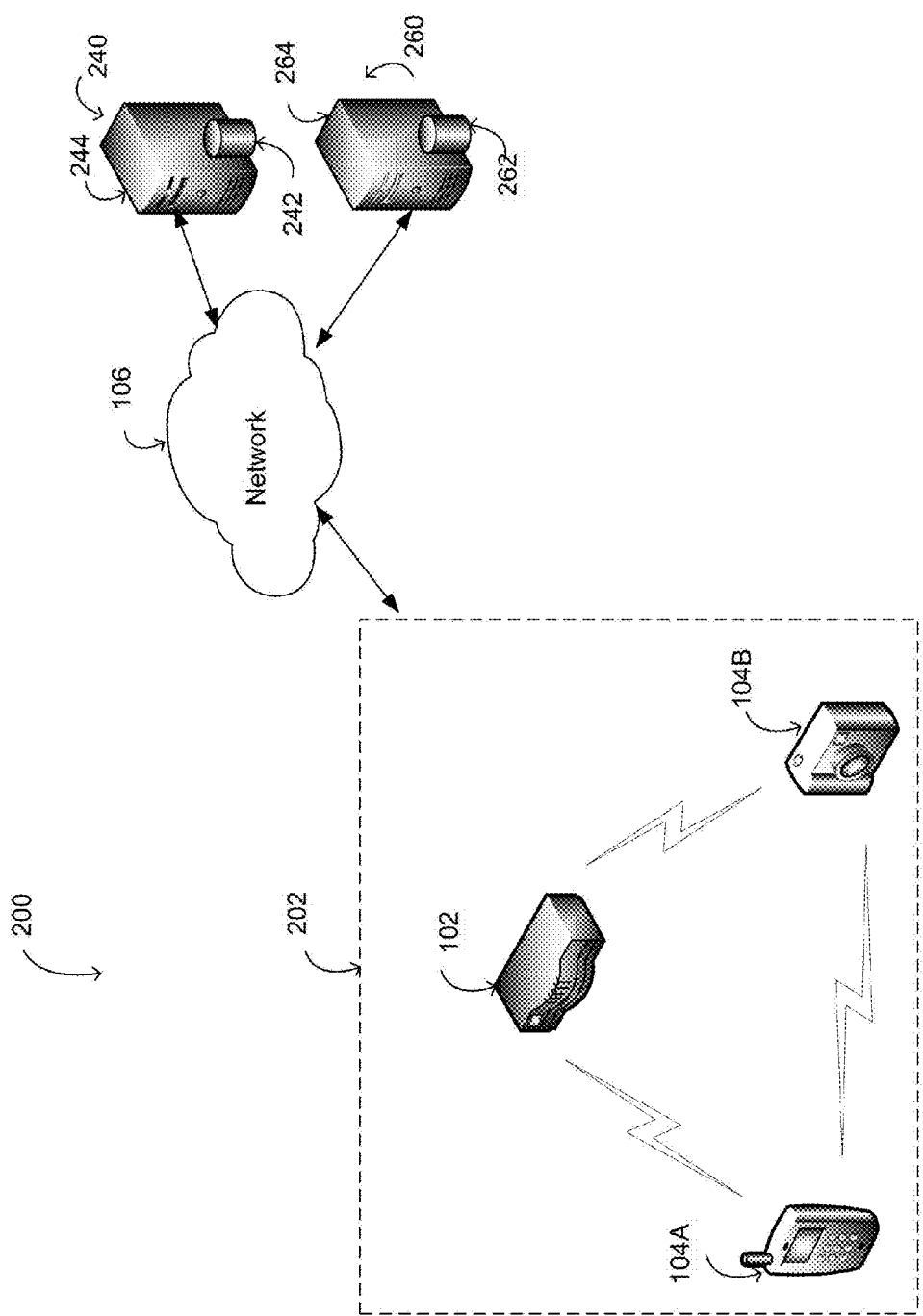
FIG. 2 illustrates an exemplary network environment to enable an IoT device into a WiFi™ network in accordance with one or more embodiments of the present disclosure.

FIG. 2 illustrates an exemplary network environment 200 to enable an IoT device into a WiFi™ network in accordance with one or more embodiments of the present disclosure. Network environment 200 includes wireless local area network area 202, network 106, and servers 240 and 260. For example, by way of illustration only and not by way of limitation, wireless local area network area 202 may include IoT devices 104A and 104B and wireless access point 102. Servers 240 and 260 may include computing devices 244 and 264 and computer-readable storage devices 242 and 262. The network environment 200 includes a wireless access point 102 that facilitates communication between IoT devices 104A and 104B.

In some aspects, network environment 200 may be a distributed client/server system that spans one or more networks such as, for example, network 106. Network 106 can be a large computer network such as, for example, wide area network (WAN), the Internet, a cellular network, or a combination thereof connecting any number of mobile clients, fixed clients, and servers. Further, the network 106 can include, but is not limited to, any of the following network topologies, including a bus network, a star network, a ring network, a mesh network, a star-bus network, tree or hierarchical network, and the like. In some aspects, communication between IoT devices 104A-104B and servers 240 and 260 can occur via a virtual private network (VPN), Secure Shell (SSH) tunnel, or other secure network connection. In some aspects, network 106 may further include a corporate network (e.g., intranet) and one or more wireless access points.

Wireless local area network 202 can include, but is not limited to, a computer network that covers a limited geographic area (e.g., a home, school, computer laboratory, or office building) using a wireless distribution method (e.g., spread-spectrum or OFDM). Wireless client devices 104A-104B may associate with wireless access point 102 to access wireless local area network 106 using WiFi™ standards (e.g., IEEE 802.11). Wireless access point 102 may include other network components in addition to a wireless access point. For example, wireless access point 102 may include a router, switch, bridge, broadband modem etc. According to aspects of the subject technology, wireless access point 102 is a wireless router that provides both access point functionality and network routing functionality.

Server 240 may be any system or device having a processor, a memory, and communications capability for providing content and/or services to the IoT devices 104A-104B, for example. In some example aspects, the server 240 can include a single computing device 244, for example, or can include more than one computing device working together to perform the actions of a server (e.g., cloud computing, server farm). Further, the server 240 can represent various forms of servers including, but not limited to, a web server, an application server, a proxy server, etc.

Similarly, server 260 may be any system or device having a processor, a memory, and communications capability for providing content and/or services to the IoT devices 104A-104B. In some example aspects, the server 260 can be a single computing device 264, for example, or can include more than one computing device working together to perform the actions of a server (e.g., cloud computing, server farm). Further, the server 260 can represent various forms of servers including, but not limited to, a web server, an application server, a proxy server, etc.

A cloud-based service may include services provided by one or more servers, such as server 240 and server 260, via one or more networks, such as network 106. Cloud-based services may require authentication of user account credentials for access via a cloud-based application, such as a web-based personal portal, a web-based email application, etc. A cloud-based service has access to computer-readable storage devices 242 and 262 and may store information or data of a user once the user account credentials are authenticated. The stored data or information is also available to the user for future access and possible manipulation via other applications that are employed by the user.

Each of IoT devices 104A-104B may represent various forms of processing devices. By way of illustration only and not by way of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 2, IoT devices 104A-104B, WiFi™ enabled devices, connect and communicate with the wireless access point 102 using wireless links. These wireless links may be established and managed using various protocols including the IEEE 802.11 protocols. The IoT devices 104A-104B may communicate wirelessly through a communication interface (not shown), which may include digital signal processing circuitry. In addition to the IEEE 802.11 protocols, the communication interface may provide for communications under other modes or protocols such as, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

According to aspects of the subject technology, IoT device 104B is a new device and/or an IoT device that requires access to wireless local area network 202. A user will initiate a HMI within IoT device 104A (e.g., a smart phone device). The HMI accepts an entry from the user, via a user interface, in the form of credentials to access the wireless local area network 202. The credentials maybe an SSID and a passphrase to enable access to wireless local area network 202 via WAP 102. The HMI initiates a request to send the SSID and the passphrase as a UDP packet(s). IoT device 104A sends a UDP packet(s) to WAP 102, where in the UDP packet(s) includes the SSID and the passphrase to access to wireless local area network 202. The WAP 102 re-transmits the UDP packets within the wireless local area network 202. IoT device 104B receives the UDP packets and processes the packets according to a predefined-instruction within the IoT device 104B to extract the SSID and passphrase from the UDP packets. The IoT device 104B sends a request to WAP 102 to join the wireless local area network 202. IoT device 104B joins the wireless local area network 202 once the passphrase and the SSID is authenticated by WAP 102.

Figure 3:
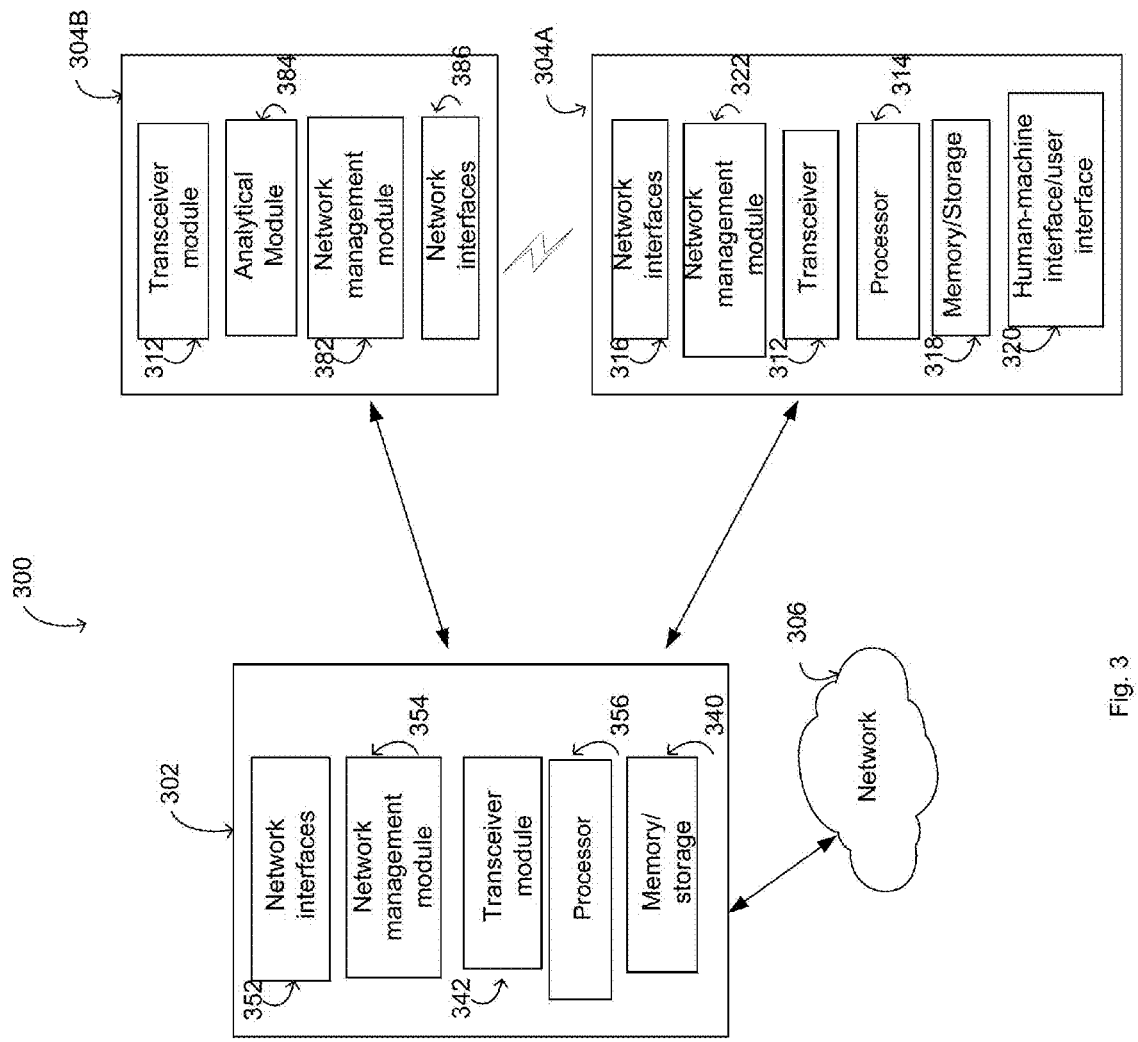
FIG. 3 illustrates IoT devices, network wireless access point and network in accordance with one or more embodiments of the present disclosure.

FIG. 3 illustrates IoT devices 304A and 304B, network wireless access point 302 and network 306 similar to the IoT devices 104A and 104B, wireless access point 102 and network 106 of FIG. 2, respectively, in accordance with one or more embodiments of the present disclosure. Not all of the components depicted in the figure may be used, however, and one or more implementations may include additional components not shown in the figure. Variations in the arrangement and type of the components may be made without departing from the scope of the subject technology. Additional components, different components, or fewer components may be provided.

IoT device 304A, depicted as a wireless user device, includes processor 314, memory/storage 318, transceiver 312, HMI application 320, network interfaces 316, network management module 322. Memory/storage 318 may include a dynamic random-access memory (DRAM) and/or a read-only memory (ROM). memory/storage 318 may provide a temporary location to store data and instructions retrieved and processed by processor 314. memory/storage 318 may include a non-volatile read-and-write memory that stores data and instructions retrieved and processed by processor 314. For example, memory/storage 318 may include magnetic, solid state and/or optical media.

Processor 314 may retrieve and execute instructions from memory/storage 318, in order to perform the processes of the subject disclosure. Processor 314 can be a single processor, a multi-core processor, or multiple processors in different implementations. HMI application 320 and network management module 322 may include one or more sets of instructions stored in memory/storage 318 that, when executed by processor 314, cause processor 314 to perform operations described herein.

HMI application 320 may be configured to receive and authenticate user credentials for a WAP 302, the HMI 320 may receive an SSID and a passphrase from a user. HMI application 320 requests a UDP packet from network management module 322 including the authenticating user credentials to be sent to a WAP such as 302. Network management module 322 manages IoT device 304A device communications with network interfaces 316 and HMI 320. In some aspects, network interface 316 is a machine-interface.

Wireless access point 302 includes processor 356, transceiver 342, network interface 352, network management module 354 and memory/storage 340. Wireless access point 302 may establish a network connection with IoT device 304A via network interfaces 352. Memory/storage 340 may include a dynamic random-access memory (DRAM) and/or a read-only memory (ROM). Memory/storage 340 may provide a temporary location to store data and instructions retrieved and processed by processor 356. Memory/storage 340 may include a non-volatile read-and-write memory that stores data and instructions, even when wireless access point 302 is off, that may be retrieved and processed by processor 356. For example, memory/storage 340 may include magnetic, solid state or optical media.

Processor 356 may retrieve and execute instructions from Memory/storage 340 in order to perform the processes of the subject disclosure. Processor 356 can be a single processor, a multi-core processor, or multiple processors in different implementations. Network management module 354 may include one or more sets of instructions stored in Memory/storage 340 that may include instructions that, when executed by processor 356, cause processor 356 to perform operations described herein.

Network interface 352 and network management module 354 may be configured to manage the process of associating IoT devices 304A-304B with wireless access point 302. In some aspects, network interface 352 is a machine-interface. For example, network management module 354 may broadcast availability of the wireless access point 302 in a beacon message and reply to authentication and accessing the wireless local area network requests received from wireless client devices (e.g., IoT devices 104A-104B) according to connection protocols such as the 802.11 protocols and variations described herein. In response to authentication requests from IoT devices 104A-104B, network management module 354 authenticates the network access credentials and, upon authentication, the network management module 354 grants IoT devices 304A and 304B access to WAP 302.

IoT device 304B, depicted as an IoT device to be joined into the WAP 302 network, includes analytical module 384, transceiver module 312, network management module 382 and network interfaces 386. In some aspects, network interface 386 is a machine-interface. Network management module 382 and network interfaces 386 may be configured to manage the discovery of wireless local area networks and the association process between the IoT device 304B and the discovered wireless local area networks. Upon discovery of a wireless access point that supports and accepts the network access credentials as described herein, the network management module 382 may send a request to join WAP 302 network.

Analytical module 384 may include a memory/storage and processor similar to memory/storage 318 and processor 314 of IoT device 304A. Analytical module 384 utilizes a processor and may retrieve and execute instructions from memory/storage unit within the analytical module 384, in order to perform the processes of the subject disclosure. According to aspects of the subject technology analytical module 384 receives the UDP packets from WAP 302, analyze the packets, extract the passphrase from the UDP packet and follow a routine to request joining WAP 302.

Figure 4A:
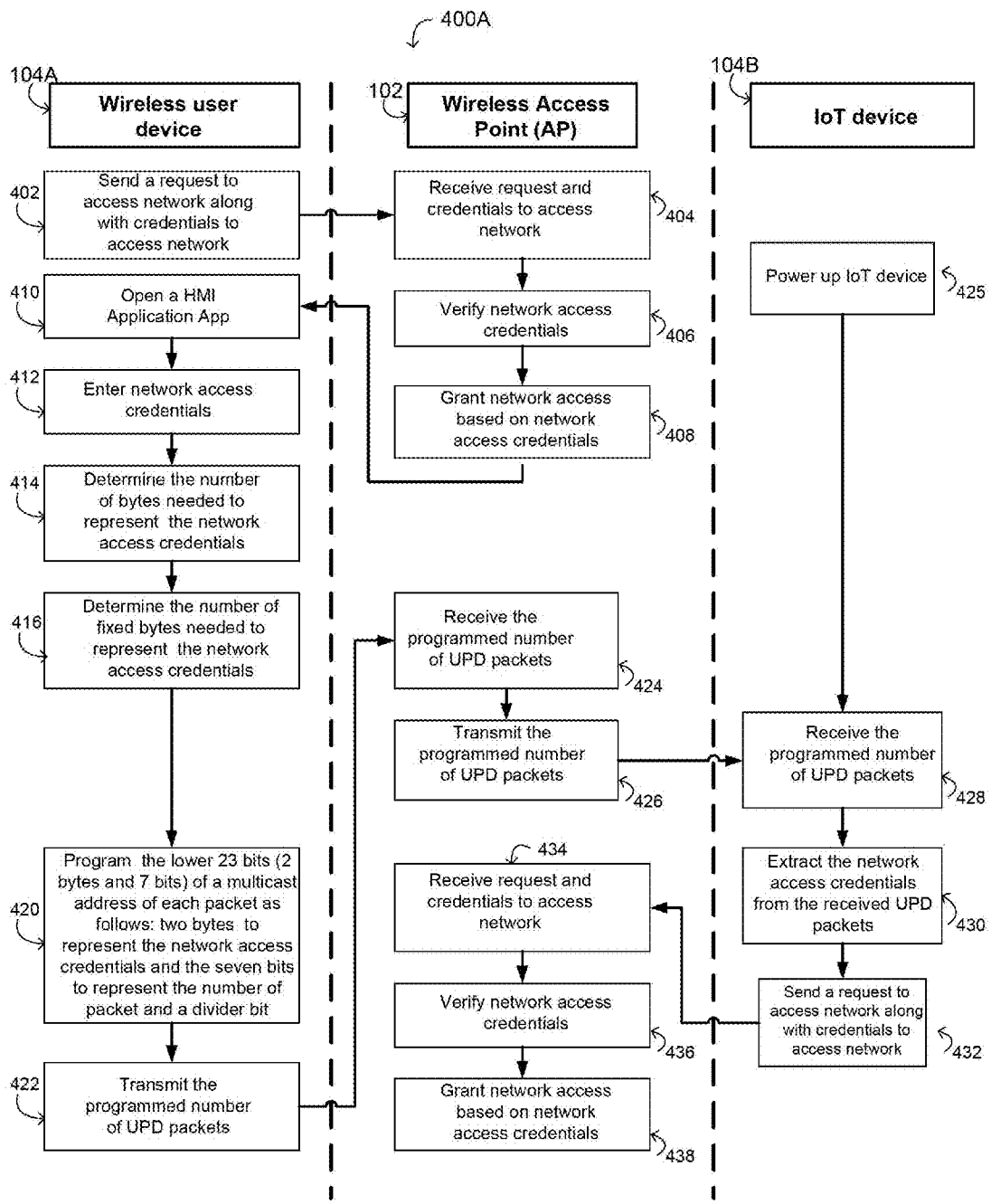
FIG. 4A illustrates a flow chart of process to enable an IoT device to access a wireless local area access network in accordance with one or more embodiments of the present disclosure.

FIG. 4A illustrates a flow chart of a process 400A to enable an IoT device to access a wireless local area network in accordance with one or more embodiments of the present disclosure. For explanatory purposes, the example process 400A is described herein with reference to wireless access point 102, wireless client device 104A, and IoT device 104B of FIGS. 1-2; however, the example process 400A is not limited to wireless access point 102, wireless client device 104A, and IoT device 104B of FIGS. 1-2, and the example process 400A may be performed by one or more components of wireless access point 102, wireless client device 104A, and IoT device 104B. Further for explanatory purposes, the blocks of the example process 400A are described herein as occurring in serial, or linearly. However, multiple blocks of the example process 400A may occur in parallel. In addition, the blocks of the example process 400A may be performed a different order than the order shown and/or one or more of the blocks of the example process 400A may not be performed.

Wireless access point 102 broadcasts a message indicating availability for authentication based on network access credentials. The broadcast message may be a beacon announcing the presence of the wireless access point 102 and including information about the wireless local area network associated with the wireless access point 102 such as a network identifier (e.g., SSID). In block 402, wireless user device 104A sends a request to wireless access point 102 to access the wireless local area network. The request includes network access authentication information including SSID and passphrase. In block 404, upon receiving the request to join the wireless local area network, the WAP 102 authenticates the provided SSID and passphrase in block 406 and grants access to the wireless local area network based on the authentication in block 408.

A user may have a new IoT device 104B that needs to be part of the wireless local area network, or the IoT device 104B may be an existing IoT device that has lost connection to the wireless local area network. Accordingly, the user may initiate the process of adding the IoT device 104B to the network by utilizing an HMI application as depicted in block 410. The user enters the network access credentials (e.g., SSID and passphrase) manually through the HMI application as depicted in block 412. In block 414, the HMI application determines the number of bytes needed to represent the network access credentials. In block 416 the HMI application determines the number of fixed bytes needed to represent the network access credentials. Further, in block 418 and based on the number of bytes from block 414 and block 416, a number of UDP packets is determined to represent the full passphrase of the network access credentials.

In block 420, wireless user device 104A programs the low-order 23 bits (i.e., the 23 least significant bits) of the multicast address of an Open System Interconnection (OSI) model as follows: two bytes (i.e., 16 bits) to represent the network access credentials, 6 bits to represent the sequence number of the UDP packet and 1 bit as a divider bit between the network credentials and the sequence number of the UDP packet. The wireless user device 104A then transmits the programmed UDP packets to WAP 102 as depicted in block 422. Wireless access point 102 receives the programmed UDP packets in block 424 and transmits (e.g., broadcasts) the received programmed UDP packets as depicted in block 426. According to aspects of the subject technology, the IoT device 104B once powered up (e.g., either for the first time and/or via a dedicated reset button), as depicted in block 425, receives the UDP packets broadcasted by WAP 102 as depicted in block 428. In block 430, the IoT device 104B extracts the network access credentials from the UDP packets utilizing a predetermined set of instructions.

According to aspects of the subject technology, the IoT device 104B sends a request to WAP 102 to access the wireless local area network utilizing the extracted network access credentials as depicted in block 432. The WAP 102 receives the request and the network credentials to join the wireless local area network as depicted in block 434. The WAP 102 then authenticates the network access credentials in block 436 and grants access to IoT device 104B, upon authentication, to the wireless local area network as depicted in block 438.

Figure 4B:
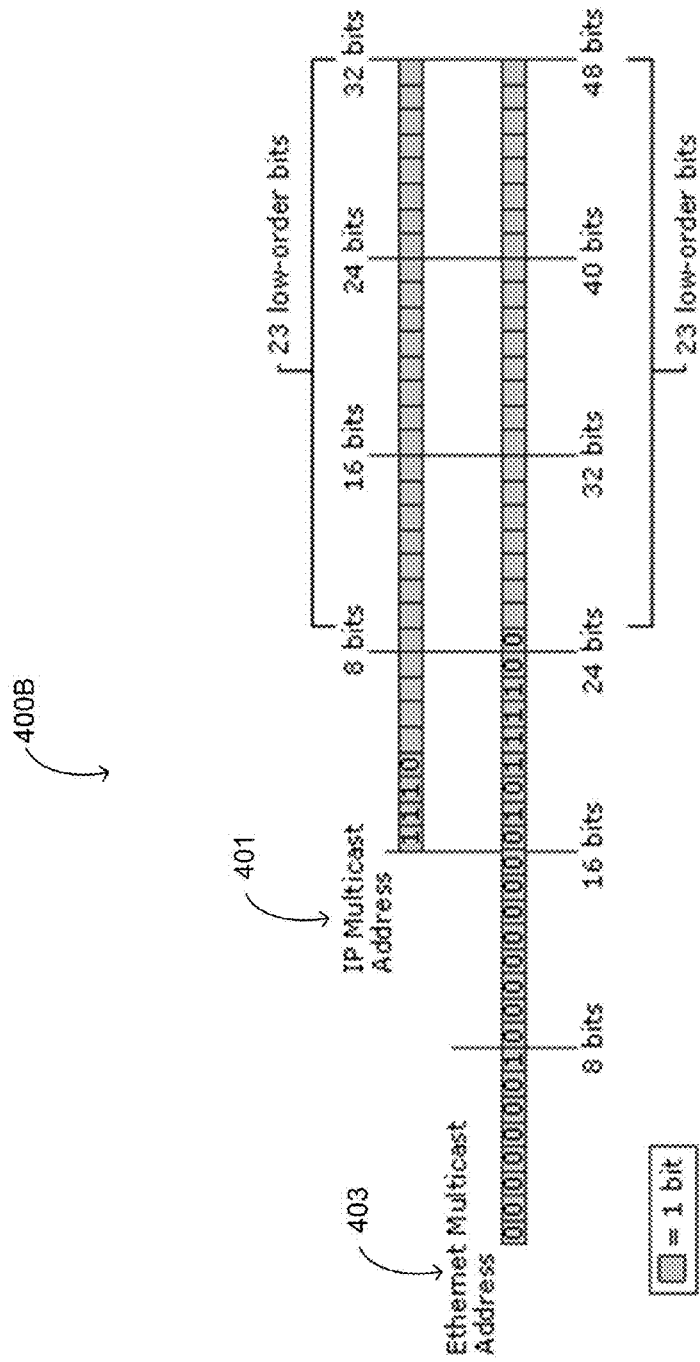
FIG. 4B is an exemplary illustration of a multicast address programming scheme in accordance with one or more embodiments of the present disclosure.

FIG. 4B is an exemplary illustration 400B of a multicast address programming scheme in accordance with one or more embodiments of the present disclosure. According to aspects of the subject technology, the network access credentials are programmed in the low-order 23 bits of the multicast address (e.g., IP multicast address 401 or Ethernet multicast address 403, where the IP multicast address is mapped to media access control layer (MAC-layer) multicast). In one or more implementations, to determine the number of bytes required to represent the network access credentials as depicted in block 414 and block 416, and ensure a successful reception and extraction of the network access credentials by the IoT device 104B, a fixed and variable number of bytes is required. The fixed bytes are 4 bytes of a cyclic redundancy check (e.g., CRC32) to detect accidental changes to raw data transmitted (or encrypted data) within the packet, one byte to indicate the length of the SSID length, one byte to determine encryption type to the transmitted raw data, one byte to indicate passphrase length, totaling 7 fixed bytes. The variable number of bytes is to represent both the SSID and the passphrase where the number of bytes needed is determined based on the length of the SSID and the passphrase words. In one or more implementations, the network access credentials might not be encrypted resulting in 6 fixed bytes. Accordingly, not all fixed bytes are needed every time a network access credentials are programmed on a multicast address.

For example, by way of illustration only and not by way of limitation, if the SSID word is a 4 letter word, then 4 bytes are needed to represent each letter of the SSID. Similarly, if the password is a 5 letter word then 5 bytes are needed to represent each letter. In this case a total number of bytes required to represent the network access credentials successfully is 7 fixed bytes and 9 bytes to represent the variable bytes for the SSID and the passphrase in this example, totaling 16 bytes. Further, to determine the number of UDP packets required to represent the network access credentials and given that each UDP packet allows 2 bytes to transmit bytes representing the network access credentials; a total of 16 bytes divided by 2 results in total 8 UDP packets required. In addition, the remaining 7 bits of the low-order 23 bits of the multicast address are programmed to represent the sequence number of the packets (i.e., 1-8 in this example) utilizing 6 bits where the seventh bit is a divider bit between the sequence number bits and the 2 bytes of the credentials.

According to aspects of the technology, the UDP packet is re-transmitted by WAP 102 on a predetermined multicast transmitting channel. The predetermined multicast transmitting channel is programmed on the IoT device 104B instructing the IoT device 104B to only capture UDP packets broadcast on the predetermined multicast transmitting channel and ignore all other UDP packets on other multicast transmitting channels. The IoT device 104B is further programmed to search for the divider bit at the specified location within the low-order 23 bits of the multicast address. The utilization of the divider bit and the knowledge of the predetermined multicast transmitting channel aids the IoT device 104B in rejecting UDP packets that might not be of interest to the 104B device.

In one or more implementations, the ISSD is not included in the UDP packets. The IoT device 104A extracts the basic service set identifier (BSSID) from the UDP packets and employs the BSSID to identify the SSID associated with the BSSID. Once the SSID is identified the IoT device 104B sends a request to the WAP 102 requesting access to the wireless local area network using the extracted passphrase and the identified SSID. In some aspects, the UDP packets are encrypted before transmission by device 104A and a decryption capability is utilized on the receiving IoT device 104B to extract the raw data within the UDP packets.

FIG. 5 illustrates conceptually an example electronic system 500 with which some implementations of the present disclosure may be implemented. Electronic system 500 may be a gateway device, a set-top box, a computer (e.g., desktop computer or laptop computer), a phone, a personal digital assistant (PDA), a server, a switch, a router, a base station, a receiver, or any other sort of electronic device that transmits signals over a network, such as electronic devices embedded in smart appliances and other smart systems. The electronic system 500 may be, and/or may be a part of, the proxy device and/or one or more of the smart devices. For example, the electronic system 500 may be a sensor, an active device, and/or an actuator. Such an electronic system includes various types of computer readable media and interfaces for various other types of computer readable media.

The electronic system 500 may include a processor 510 such as a processor 315 and processor 356 and analytical module 384 as depicted in FIG. 3. The processor 510 may be coupled to a computer-readable storage medium, such as a memory 532 (e.g., a non-transitory computer-readable medium), via a transceiver 550. The transceiver 550 may correspond to transmitter 312 and transceiver 342 as depicted in FIG. 3. Moreover, as depicted in FIG. 5, the processor 510 may be external transceiver 550. For example, the processor 510 may be "off-chip" with respect to the transceiver 550. In another embodiment, the processor 510 and the transceiver 550 are integrated within a system-in-package or system-on-chip device 522, as explained further below.

The memory 532 may store instructions 554 that are executable by the processor 510, data 556 that is accessible to the processor 510, or a combination thereof. In a particular embodiment, the memory 532 is a volatile memory that is accessible to the processor via transceiver 550. FIG. 5 also shows a display controller 526 that is coupled to the processor 510 and to a display 528. A coder/decoder (CODEC) 534 may also be coupled to the processor 510. A speaker 536 and a microphone 538 may be coupled to the CODEC 534. FIG. 5 also indicates that a wireless controller 540 may be coupled to the processor 510. The wireless controller may be further coupled to an antenna 542 via a transceiver 550. A camera 546 may be coupled to a camera controller 590. The camera controller 590 may be coupled to the processor 510.

In a particular embodiment, the processor 510, the memory 532, the display controller 526, the camera controller 590, the CODEC 534, the wireless controller 540, and the transceiver 550 are included in the system-in-package or system-on-chip device 522. An input device 530 and a power supply 544 may be coupled to the system-on-chip device 522. Moreover, in a particular embodiment, and as illustrated in FIG. 5, the display 528, the input device 530, the camera 546, the speaker 536, the microphone 538, the antenna 542, and the power supply 544 are external to the system-on-chip device 522. However, each of the display 528, the input device 530, the camera 546, the speaker 536, the microphone 538, the antenna 542, and the power supply 544 may be coupled to a component of the system-on-chip device 522. As a particular example, the processor 510 and the memory 532 are coupled to transceiver 550.

In connection with the present disclosure, a computer-readable storage medium (e.g., the memory 532) stores data (e.g., the data 556) that is accessible to a processor (e.g., the processor 510) during modes of operation of transceiver 550. The data 556 may be a method instruction as depicted in FIG. 4A and FIG. 4B. The method instructions are executable by processor 510, where the instructions include steps on how to operate and configure the transceiver 550. Finally, as depicted in FIG. 5, electronic system 500 couples to a network through a network interface 516. In this manner, the electronic system 500 may be a part of a network of computers (for example, a local area network (LAN), a wide area network (WAN), or an Intranet, or a network of networks, for example, the Internet. Any or all components of electronic system 500 may be used in conjunction with the subject disclosure. The network interface 516 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the electronic system 500, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of operating a human-machine interface system comprising:
    receiving user input on a user interface of a wireless user device, wherein the user input comprises wireless network access credentials;
    determining a total number of bytes to represent the wireless network access credentials, wherein the determining is based at least on the length of the wireless network access credentials;

determining a total number of user datagram packets (UDP) based on the total number of bytes;

generating the total number of the UDP packets, wherein each of the UDP packets includes an address comprising an upper part identifying the address as a multicast address and a lower, 23-bit, part, wherein the upper 7 bits of the lower part includes a UDP sequence number and a divider bit and the lowest 16 bits of the lower part includes information associated with the wireless network access credentials and fixed bytes; and transmitting the total number of UDP packets by the wireless user device.

2. The method of claim 1, wherein the wireless network access credentials comprise a service set identifier (SSID) word and a passphrase word.

3. The method of claim 1, wherein the fixed bytes comprise cyclic redundancy check (CRC) bytes, service set identifier (SSID) length bytes, passphrase length bytes and encryption information bytes.

4. The method of claim 1, further comprising:

receiving the total number of UDP packets by an access point device;

retransmitting the total number of UDP packets by the access point device;

receiving the total number of UDP packets by a wireless device; and extracting the wireless network access credentials from the received UDP packets.

5. The method of claim 1, wherein generating the lower, 23-bit, part of the multicast address comprises dedicating the lowest 16 bits as the upper 16 bits of the lower part, and dedicating the upper 7 bits of the lower part as the lowest 7 bits of the lower part, and wherein the 7 bits includes the divider bit followed by the UDP sequence number.

6. A human-machine interface system comprising:

a user interface configured to receive a user input wherein the user input comprises network access credentials; and one or more processors configured to determine a total number of bytes to represent the wireless network access credentials, wherein the determining is based on the length of the wireless network access credentials, and wherein the one or more processors are further configured to determine a total number of a user datagram (UDP) packets based on the total number of bytes and to generate the total number of UDP packets, wherein at least a portion of each of the UDP packets is based on the wireless network access credentials;

wherein each of the UDP Rackets includes an address comprising an upper part identifying the address as a multicast address and a lower, 23-bit, part, wherein the upper 7 bits of the lower part includes a UDP sequence number and a divider bit and the lowest 16 bits of the lower part includes information associated with the wireless network access credentials and fixed bytes; and wherein the one or more processors are further configured to transmit the total number of UDP packets.

7. The system of claim 6, wherein the one or more processors are configured to receive UDP packets and extract the wireless network access credentials from the received UDP packets.

8. The system of claim 7, wherein the one or more processors are distributed among a number of wireless devices.

9. The system of claim 6, wherein the wireless network access credentials comprise a service set identifier (SSID) word and a passphrase word.

10. A non-transitory machine-readable medium comprising instructions stored therein, which, when executed by one or more processors cause the one or more processors to perform operations comprising:

receiving a user input on a user interface of a wireless user device, wherein the user input comprises wireless network access credentials;

determining a total number of bytes to represent the wireless network access credentials, wherein the determining is based on the length of the wireless network access credentials;

determining a total number of a user datagram (UDP) packets based on the total number of bytes; and generating the total number of the UDP packets, wherein at least a portion of each of the UDP packets is based on the wireless network access credentials;

wherein each of the UDP packets includes an address comprising an upper part identifying the address as a multicast address and a lower, 23-bit, part, wherein the upper 7 bits of the lower part includes a UDP sequence number and a divider bit and the lowest 16 bits of the lower part includes information associated with the wireless network access credentials and fixed bytes; and wherein the one or more processors are further configured to transmit the total number of UDP packets.

11. The non-transitory machine-readable medium of claim 10, wherein the wireless network access credentials comprise a service set identifier (SSID) word and a passphrase word.

12. The non-transitory machine-readable medium of claim 10, wherein the total number of bytes include fixed bytes and wherein the fixed bytes are cyclic redundancy check (CRC) bytes, service set identifier (SSID) length bytes, passphrase length bytes and encryption information bytes.

* * * * *